United States Patent [19]

Poe

[11] 4,409,302
[45] Oct. 11, 1983

[54] VENTING SYSTEM FOR ELECTRIC STORAGE BATTERY

[75] Inventor: David T. Poe, Yorktown, Ind.

[73] Assignee: General Motors Corporation, Detroit, Mich.

[21] Appl. No.: 305,096

[22] Filed: Sep. 24, 1981

[51] Int. Cl.³ ............................................. H01M 2/12
[52] U.S. Cl. ...................................... 429/88; 429/89
[58] Field of Search ................. 429/88, 89, 100, 87

[56] References Cited

U.S. PATENT DOCUMENTS

| | | | |
|---|---|---|---|
| 2,994,731 | 8/1961 | Buskirk et al. | 429/89 |
| 3,020,328 | 2/1962 | Jones | 429/89 |
| 3,879,227 | 4/1975 | Hennen | 429/88 X |
| 4,098,963 | 7/1978 | Mocas | 429/88 |
| 4,306,002 | 12/1981 | Heiser et al. | 429/88 X |

OTHER PUBLICATIONS

The Commercial "Freedom" Battery.

*Primary Examiner*—Anthony Skapars
*Attorney, Agent, or Firm*—Lawrence B. Plant

[57] ABSTRACT

A venting system for an electric storage battery including an electrolyte trapping chamber having a floor sloping toward a venting/drainage aperture at the low point of the floor and a drip tab beneath the rim of the aperture to enhance electrolyte drainage from the chamber floor. A surrounding skirt and supplemental baffle reduce electrolyte invasion of the aperture.

5 Claims, 7 Drawing Figures

VENTING SYSTEM FOR ELECTRIC STORAGE BATTERY

This invention relates to vented electric storage batteries and more specifically to venting systems therefor.

BACKGROUND OF THE INVENTION

Pb-acid storage batteries, among others, generate gases within the innards of the battery during the normal cycling thereof. These gases are vented to the atmosphere via venting systems designed to permit gas passage while trapping electrolyte. Such systems include provisions for draining any trapped electrolyte back into the battery cells from whence it came.

Battery venting systems geneerally take two forms, i.e. vertical or horizontal depending on the orientation of the chamber in which the electrolyte is trapped. In this regard, both systems typically include a chamber, of one sort or another, located between a cell vent/drainage aperture and a gas exhaust port leading to the atmosphere. The chamber traps electrolyte emanating from the cell vent and prevents it from traversing to the exhaust port and escaping the battery. Electrolyte collected in the trapping chamber drains back into the cell usually through the same aperture used to vent the cell.

Discrete vent plugs found on many batteries exemplify vertical vent systems. The plugs typically include a deep, cylindrical chamber which fits tightly into the filler well of the battery. The floor of the chamber slopes toward an aperture through which the gases vent upwardly and the electrolyte drains back into the cell. The top of the chamber has an exhaust port for discharging the gas to the atmosphere. The chamber may also contain a variety of internal baffles to prevent electrolyte from reaching the exhaust port. Separation of the electrolyte from the gas occurs primarily by gravity as the gases rise through the cylindrical chamber and the heavier electrolyte falls to the chamber floor.

Horizontal vent systems, on the other hand, are most frequently formed integrally with the battery cover and usually pass the gases through an elongated chamber extending horizontally across the top of the battery before discharging it to the atmosphere at a location laterally remote from the cell vent/drainage aperture. Frequently such designs employ a single exhaust port serving several trapping chambers. Such horizontal systems may include a shallow vertical cylindrical portion depending from the cover as part of its electrolyte trapping chamber. one illustration of such a system is found in the "Freedom Battery" manufactured and sold by the assignee of the present invention.

The venting systems such as described above, frequently utilize very small (i.e., typically Ca. 1 mm-3 mm) venting/drainage apertures in the trapping chamber floor to minimize entry of splashing electrolyte into the trapping chambers while permitting the gases to pass. None-the-less, the trapping chambers are commonly invaded by electrolyte entering up through the venting/drainage aperture as a result of excessive overcharging, sloshing, splashing etc. (i.e., due to mishandling, vibration, tilting, or the like). While these small apertures permit gas passage and reduce electrolyte passage they are not conducive to optimum drain back of electrolyte into the battery cells. In this regard, the surface tension between the electrolyte and the rim of the drainage aperture (i.e., capillary effect) tends to hold the electrolyte in the aperture—much like a liquid plug—until such time as an overpowering head of electrolyte accumulates on the floor of the chamber above. While accumulation of electrolyte in the trapping chambers of any venting system is undesirable it is a particularly acute problem in horizontal systems. In this regard, accumulated electrolyte in horizontal chamber systems can more readily traverse the trapping chamber and reach the exhaust port than in vertical chamber systems.

It is the principal object of the present invention to improve electrolyte drainage from the electrolyte trapping chambers of battery gas venting systems. It is a further object of the present invention to concurrently better protect the trapping chambers from electrolyte invasion from the battery innards due to sloshing, splashing or the like. These and other objects and advantages of the present invention will become more readily apparent from the description thereof which follow.

SUMMARY OF THE INVENTION

In accordance with the present invention, electrolyte drainage from the electrolyte trapping chamber of a battery gas venting system is enhanced by means of a drip tab located at the underside of the rim defining the cell venting/drainage aperture in the floor of the trapping chamber. The drip tab angles sharply downwardly from the underside of the chamber floor so as to lie beneath the aperture, disrupts the capillarity between the electrolyte and the rim of the aperture, and promotes virtual total drainage of electrolyte from the trapping chamber floor. While a narrow finger-like tab would be adequate to drain off the electrolyte, a preferred embodiment has a drip tab which is wide enough and long enough as to underlie substantially the entirety of the aperture and thereby also function as a baffle to prevent electrolyte splash from directly entering the drainage aperture from beneath. A depending skirt surrounds the tap to minimize circumvention of the edges of the drip tab by splashing electrolyte.

In a most preferred embodiment, a second, tongue-like baffle depends from the underside of the trapping chamber floor at angle opposite to that of the drip tab angle and so as to extend beneath the distal end of the drip tab. The tongue-like baffle prevents splash from entering the vent/drainage aperture by circumventing the distal edge of the tab.

DETAILED DESCRIPTION OF SPECIFIC EMBODIMENTS

The invention may be better understood in the light of the following detailed description of certain specific embodiments thereof which is made in conjunction with the attached drawings in which.

Figure 1:
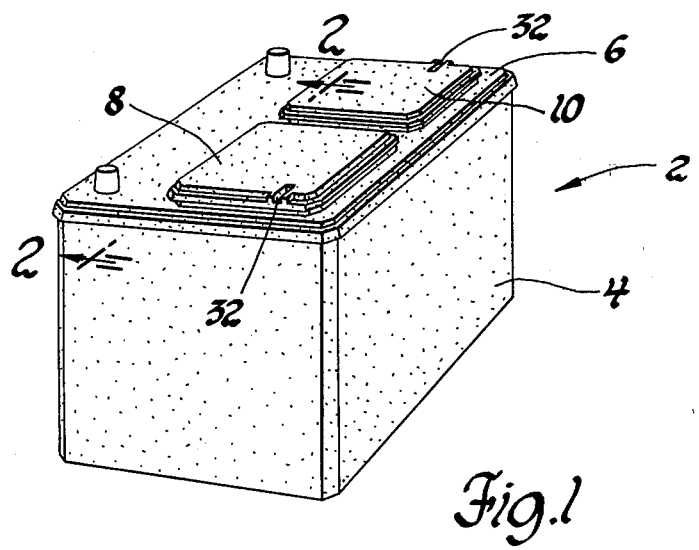
FIG. 1 is a perspective view of a battery having a horizontal venting system according to the present invention.
Figure 2:
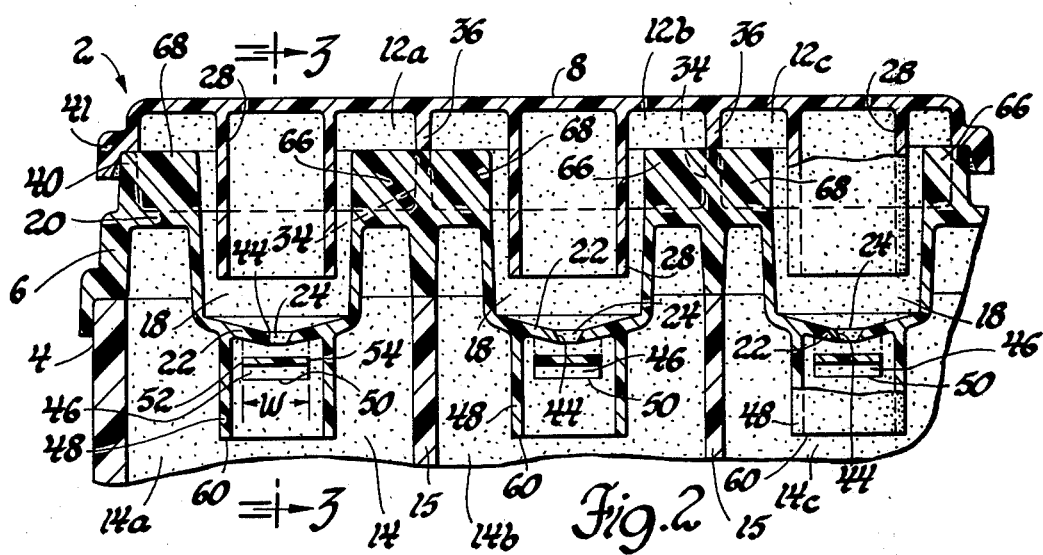
FIG. 2 is a sectioned view in the direction 2—2 of FIG. 1.
Figure 3:
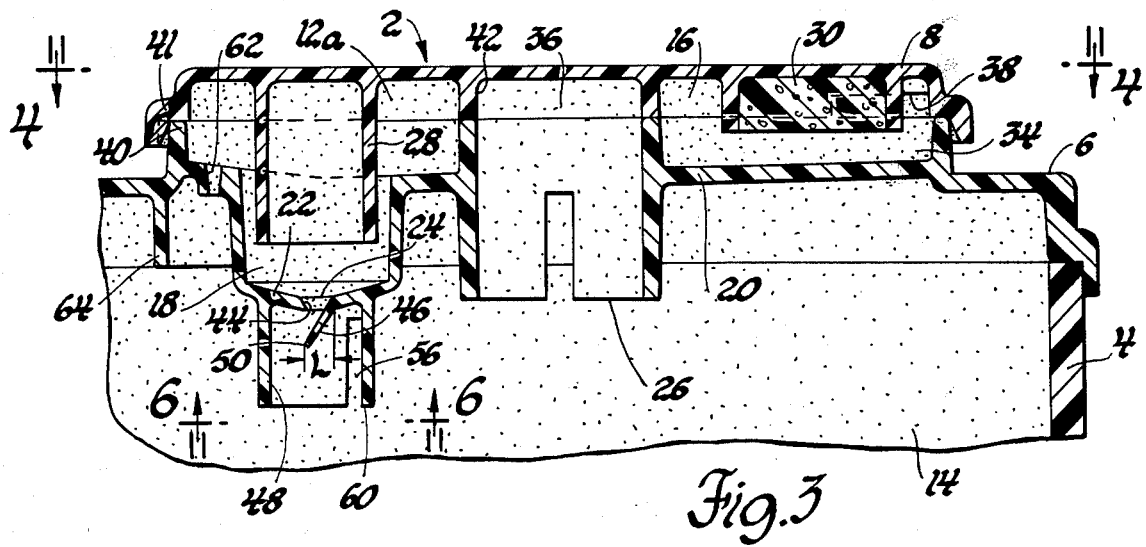
FIG. 3 is a sectioned view taken in the direction 3—3 of FIG. 2.
Figure 4:
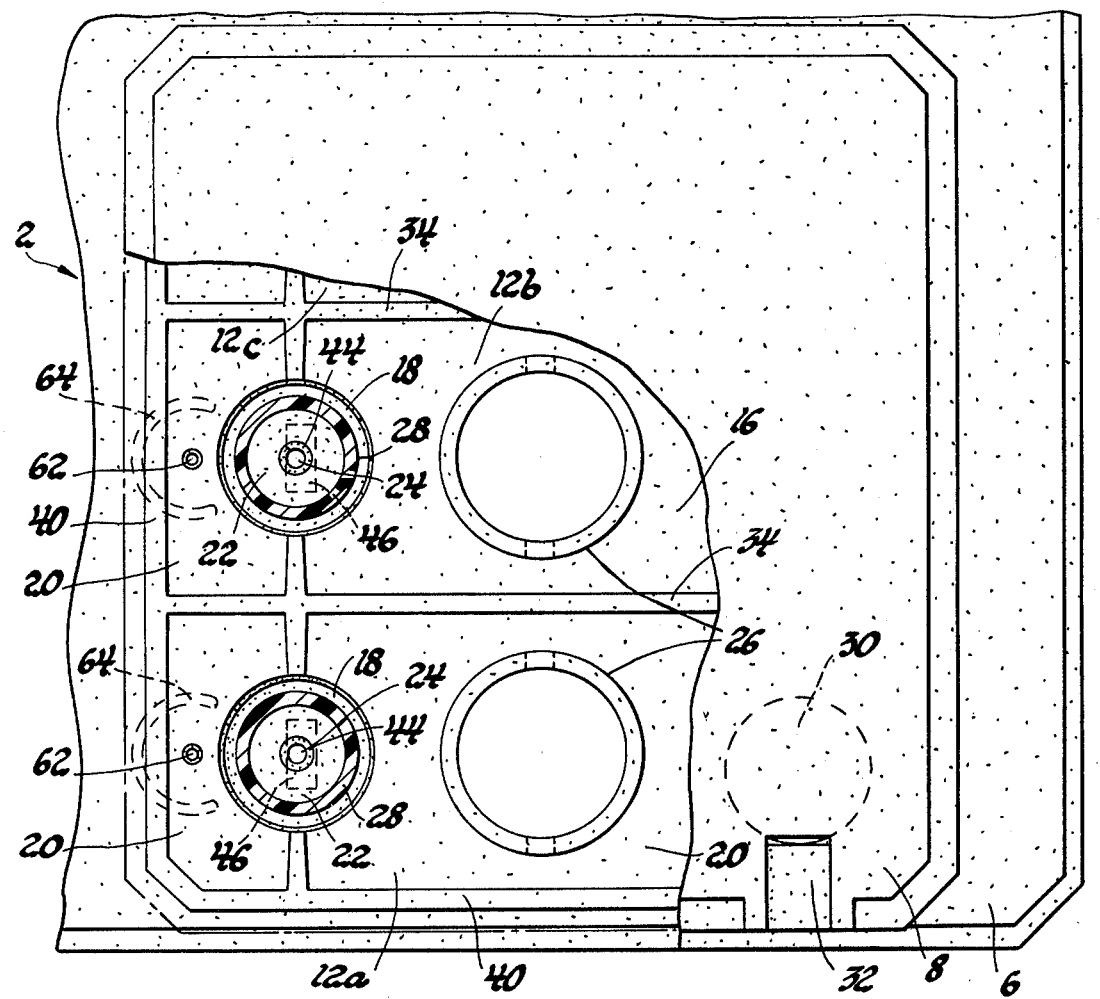
FIG. 4 is a partially broken away view taken in the direction 4—4 of FIG. 3.

FIG. 1 illustrates a battery 2 having a case 4, an intermediate cover 6 and two final covers 8 and 10. The case 4 is divided into six cells 14 by means of intercell partitions 15. Each of the final covers 8 and 10 mate with the intermediate cover 6 to form a venting system for venting three of the cells 14 as discussed hereafter in more detail.

Figure 5:
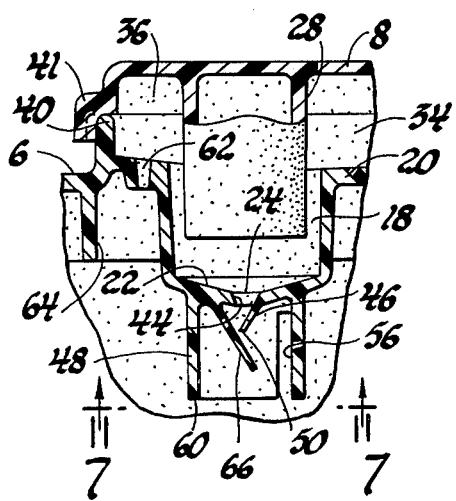
FIG. 5 is a partial, sectioned view like that of FIG. 3, but of another embodiment of the present invention.
Figures 6, 7:
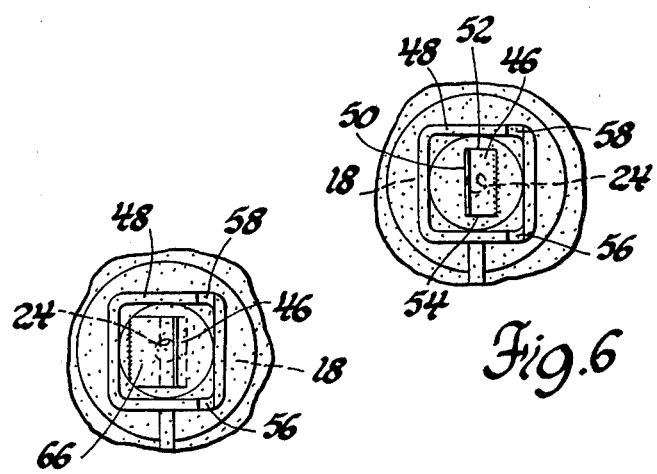
FIG. 6 is a view taken in the direction 6—6 of FIG. 3.
FIG. 7 is a view taken in the direction 7—7 of FIG. 5.

FIGS. 2-4 and 6 disclose one embodiment of the invention and FIGS. 5 and 7 another. Regardless, structure common to both embodiments shall herein be designated with the same number. The venting system housed between each final cover 8, 10 and the intermediate cover 6 includes three venting chambers 12a, 12b and 12 c one for each of three successive battery cells 14a, 14b and 14c. As the venting system for any one cell is essentially the same as for all cells, the following discussion shall be principally in terms of a single cell. Each of the venting chambers 12a, 12b, 12c includes a horizontally extending portion 16 and a depending, vertical, well portion 18 formed integrally with the intermediate cover 6. The cover 8 forms the ceiling of the chamber 12. A wall 20 forms the floor of the horizontal portion 16 of the chamber 12 and gently slopes toward the vertical well portion 18 of the chamber 12 to direct any trapped electrolyte back toward the well 18. A lower wall 22 forms the floor of the vertical well portion and slopes downwardly toward the vent/drainage aperture 24 through which the gases are vented upwardly and electrolyte drained downwardly.

The intermediate cover 6 includes electrolyte filler wells 26 which extend through the floor wall 20 for filling the individual cells 14 with electrolyte. The final covers 8, 10 each include a depending tubular portion 28 extending into the vent well 18 for preventing electrolyte splash from entering the horizontal portion 16 of trapping chamber 12. Partitions 36 dpending from the final cover 8 are heat sealed atop the upstanding partitions 34 on the intermediate cover 6 to separate the several venting chambers 12 one from the other along the longitudinal axis thereof. A small cutout 38 at the end of the depending partition 36 communicates the several adjacent vent chambers 12 with a porous flame arrestor 30 located in the final cover 8 at the far (i.e., remote from the vent well 18) end of the end chamber 12. The flame arrestor separates the several chambers 12 from the exhaust port 32 located adjacent the arrestor 30. An upstanding ridge 40 atop the intermediate cover 6 forms the peripheral border of the three chamber vent system and is heat sealed to the peripheral shoulder 41 on the cover 8. An annular skirt 42 depending from the final cover 8 is heat sealed to the top edge of the filler well 26.

The venting/draining aperture 24 through the floor wall 22 of the venting chamber well 18 is defined by a conical rim 44. A drip tab 46 depends from the lower edge of the rim 44 at an angle of approximately 60 degrees and so as to extend beneath the aperture 24. The tab 46 has a length L and width W sufficient to underlie substantially the entirety of the aperture 24 and thereby block entrance of electrolyte splash directly into the aperture 24 from beneath the tab 46.

A rectangular skirt 48 depends from beneath the floor wall 22 of vent well 18 and surrounds the tab 46 and aperture 24 and prevents electrolyte from splashing around the distal edge 50 and lateral edges 52 and 54 of the tab 46 and ultimately invading chamber 12 through the aperture 24. Vertical slots 56 and 58 are formed in the skirt 48 behind the tab 46 (i.e., side opposite the aperture 24) to permit gas to escape from the cell 14 even when the electrolyte level is above the lower edge 60 of the skirt 48. A secondary vent opening 62 is provided through the floor wall 20 for much the same purpose as the slots 56, 58 and to expel gas from the cell while electrolyte is draining back through the aperture 24. Vent opening 62 is protected from electrolyte splash by depending arcuate baffle 64. Dams 66 and 68 upstanding from the floor of the intermediate cover 6 prevent any electrolyte entering the trapping chamber 12 through opening 62 from traversing the full length thereof to the flame arrestor 30 and serve to direct such electrolyte into the well 18 for ultimate reflux to the battery cells via aperture 24.

FIGS. 5 and 7 show a most preferred embodiment of the present invention and includes, in addition to the foregoing, a tongue-like baffle 66 angling down from the lower floor wall 22. The baffle 66 extends beyond the distal end 50 of the drip tab 46 and have about the same width as the drip tab 46. The baffle 66 reduces circumvention of the distal end 50 of the tab 46 by splashing electrolyte. At the same time the skirt 48 prevents lateral circumvention of both the tab 46 and baffle 66.

The tab 46 and baffle 66 are molded very thin (i.e., Ca. 0.5 mm) and of flexible plastic (e.g., polypropylene) so that when the mold core is withdrawn from within the skirt 48 the tab 46 and baffle 66 can straighten out, but later resume their as-molded positions incident to their plastic memory.

While this invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. In an electric storage battery having a venting system for relieving gases from the innards of the battery including an electrolyte trapping chamber defined in part by a floor sloping toward an electrolyte drainage aperture at the low point of the floor and proximate the electrolyte level within the battery, the improvement comprising: a rim defining said aperture and a tongue-like drip tab depending at an acute angle from the underside of said rim so as to extend beneath said aperture and promote the running off of electrolyte from said floor back to said innards which electrolyte, but for the tab, would otherwise accumulate on said floor and plug said aperture.

2. In an electric storage battery having a venting system for relieving gases from the innards of the battery including an electrolyte trapping chamber defined in part by a floor sloping toward an electrolyte drainage aperture at the low point of the floor and proximate the electrolyte level in the battery, the improvement comprising: a rim defining said aperture, a tongue-like drip tab depending at an acute angle from the underside of said rim so as to extend beneath said aperture and promote the running off of electrolyte from said floor back to said innards which electrolyte, but for the tab, would otherwise accumulate on said floor and plug said aperture, and skirt means depending from said floor and so closely surrounding said aperture and tab as to deflect any splashing electrolyte away from said tab and aperture and thereby minimize its invasion of said aperture.

3. In an electric storage battery having a venting system for relieving gases from the innards of the battery including an electrolyte trapping chamber defined in part by a floor sloping toward an electrolyte drainage aperture at the low point of the floor and proximate the electrolyte level in the battery, the improvement comprising: a rim defining said aperture, a tongue-like drip tab depending at an acute angle from the underside of said rim so as to extend beneath said aperture for promoting the running off of electrolyte from said floor back to said innards and so as to underlie substantially the entirety of said aperture for reducing electrolyte invasion of said aperture directly from said innards, and a skirt depending from said floor and closely surrounding said aperture and tab for deflecting electrolyte splashing within said innards away from said tab to thereby minimize circumvention of said tab and invasion of said aperture by said electrolyte.

4. In an electric storage battery having a venting system for relieving gases from the innards of the battery including an electrolyte trapping chamber defined in part by a floor sloping toward an electrolyte drainage aperture at the low point thereof proximate the electrolyte level in the battery, the improvement comprising: a rim defining said aperture, a tongue-like drip tab depending at a first acute angle from the underside of said rim so as to underlie substantially the entirety of said aperture for promoting the running off of electrolyte from said floor back to said innards and reducing electrolyte invasion of said aperture directly from said innards, said tab having a root end at said rim, a distal end remote from said root end and lateral edges extending between said root and distal ends, and a tongue-like baffle depending from the underside of said floor at a second acute angle opposite that of said first angle and extending beneath said distal end to minimize circumvention of said distal end by electrolyte splashing within said innards.

5. In an electric storage battery having a case for containing the battery's active ingredients, a cover sealed to said case and a horizontal-type venting system integral with said cover for relieving gases from the innards of the battery, said venting system including an elongated electrolyte trapping chamber formed in, and extending laterally across said cover, said chamber being defined in part by a floor sloping toward an electrolyte drainage aperture at the low point thereof proximate the electrolyte level in the battery, the improvement comprising: a rim defining said aperture, a thin, flexible, tongue-like drip tab depending at a first acute angle from the underside of said rim so as to underlie substantially the entirety of said aperture for promoting the running off of electrolyte from said floor back to said innards and reducing electrolyte invasion of said aperture directly from said innards, said tab having a root end at said rim, a distal end remote from said root end and lateral edges extending between said root and distal ends, and a tongue-like baffle depending from the underside of said floor at a second acute angle opposite that of said first angle and extending beneath said distal end to minimize circumvention of said distal end by electrolyte splashing within said innards, and a skirt depending from said floor and closely surrounding said aperture and tab for deflecting electrolyte splashing within said innards away from said tab and aperture to thereby minimize lateral circumvention of said edges and invasion of said aperture by said electrolyte.

* * * * *